US005638486A

United States Patent [19]
Wang et al.

[11] Patent Number: 5,638,486
[45] Date of Patent: Jun. 10, 1997

[54] METHOD AND SYSTEM FOR CONTINUOUS SPEECH RECOGNITION USING VOTING TECHNIQUES

[75] Inventors: Shay-Ping T. Wang, Long Grove; Michael K. Lindsey, Arlington Heights, both of Ill.

[73] Assignee: Motorola, Inc., Schaumburg, Ill.

[21] Appl. No.: 329,394

[22] Filed: Oct. 26, 1994

[51] Int. Cl.[6] .................................................. G10L 5/00
[52] U.S. Cl. ........................ 395/2.45; 395/2.41; 395/2.63
[58] Field of Search ........................... 395/2, 2.12, 2.13, 395/2.26, 2.45, 2.57, 2.62, 2.63, 2.41; 381/41–43

[56] References Cited

U.S. PATENT DOCUMENTS

| | | | |
|---|---|---|---|
| 3,349,183 | 10/1967 | Campanella | 395/2.13 |
| 3,697,703 | 10/1972 | Clark, Jr. et al. | 395/2.12 |
| 3,946,157 | 3/1976 | Dreyfus | 395/2.63 |
| 4,405,838 | 9/1983 | Nitta et al. | 395/2.63 |
| 4,624,008 | 11/1986 | Vensko et al. | 381/43 |
| 4,718,093 | 1/1988 | Brown | 381/43 |
| 4,761,815 | 8/1988 | Hitchcock | 395/2.62 |
| 4,852,172 | 7/1989 | Taguchi | 381/43 |
| 4,852,180 | 7/1989 | Levinson | 381/43 |
| 4,945,566 | 7/1990 | Mergel et al. | 395/2.62 |
| 5,042,001 | 8/1991 | Brightman et al. | 364/736 |
| 5,072,452 | 12/1991 | Brown et al. | 381/43 |
| 5,073,867 | 12/1991 | Murphy et al. | 395/27 |
| 5,239,594 | 8/1993 | Yoda | 382/15 |
| 5,305,422 | 4/1994 | Junqua | 395/2.62 |
| 5,329,608 | 7/1994 | Bocchieri et al. | 395/2.52 |
| 5,365,592 | 11/1994 | Horner et al. | 381/46 |
| 5,369,726 | 11/1994 | Kroeker et al. | 395/2.45 |
| 5,404,422 | 4/1995 | Sakamoto et al. | 395/2.41 |
| 5,450,522 | 9/1995 | Hermansky et al. | 395/2.2 |

OTHER PUBLICATIONS

Jerry M. Rosenberg, Dictionary of Computers, Information Processing, and Telecommunications, 2nd Edition, p. 88.

Fundamentals of Speech Recognition, Lawrence Rabiner et al., Published by Prentice Hall, Inc., 1993, pp. 122–132.

Speech Recognition by Computer, Stephen E. Levinson et al., Scientific American, Apr. 1981, pp. 64–76.

On the Use of Bandpass Liftering in Speech Recognition, Biing–Hwang Juang et al., IEEE Transactions on Acoustics, Speech, and Signal Processing, vol. ASSP–35, No. 7, Jul. 1987.

Highly–automated, Non–parametric statistical learning for autonomous target recognition, Keith C. Drake, AbTech Corporation, 700 Harris Street, Charlottesville, Virginia 22903, pp. 1–10, Proceedings of the SPI 20th Applied Imagery Pattern Recognition Workshop, Oct. 1991, McLean, Virginia.

On the Design Principles of the Functional Link Nets, Jun Wang and Edilberto P. Teixeira, Department of Systems Engineering, Case Western Reserve University, Cleveland, Ohio 44106, pp. 613–616, Ieee International Conf. on Systems Engineering, Aug. 9–11, 1990, Vista International Hotel, Pittsburgh, Pennsylvania, IEEE Catalog No:90CH2872–0.

A Neural Feed–Forward Network with a Polynomial Non-linearity, Nils Hoffmann, Electronics Institute, Building 349, Technical University of Denmark, DK–2800 Lyngby, Denmark, Neural Networks for Signal Processing, Proceedings of the IEEE–SP Workshop, Aug. 31–Sep. 2, 199?, pp. 49–58.

(List continued on next page.)

*Primary Examiner*—David D. Knepper
*Attorney, Agent, or Firm*—Michael K. Lindsey; Bruce E. Stuckman

[57] ABSTRACT

In a speech-recognition system having a plurality of classifiers, a voting window includes a sequence of outputs from each of the classifiers. For each classifier, a voting sum is generated corresponding to the voting window. A spoken sound is identified by determining which classifier corresponds to the greatest voting sum.

21 Claims, 9 Drawing Sheets

OTHER PUBLICATIONS

A Polynomial time Algorithm for Generating Neural Networkes for Classification Problems, Asim Roy and Somnath Mukhopadhyay, Dept. of Decision and Information Systems, Arizona State University, IJCNN, 1992, 0-7803-0559-0/92 IEEE, pp. I-174-I-152.

Modeling systems with Polynomial Networks, Tools for Predicting Behavior, Peter D. Varhol, Programmer's Workbench, Dr. Dobb's Journal, Sep. 1993, Begins on p. 76.

Polynomial Functions Can Be Realized by Finite Size Multilayer Feedforward Neural Networks, Naohiro TODA, Ken-ichi FUNAHASHI and Shiro USUI, Department of Information and Computer Sciences, Toyohashi University of Technology, Tempaku, Toyohashi 441, Japan, 1991 IEEE International Joint Conference on Neural Networks, vol. 1of3, The Westin Stamford and Westin Plaza, 18-21, Nov. 1991, Singapore.

An Artificial Neural Networks for Approximating Polynomial Functions, Behnam Malakooti and YingQing Zhou, Department of Ssytems Engineering, Center for Automation and Intelligent Systmes Research, Case Western Reserve University, Cleveland, Ohio, International Joint Conference on Neural Networks, Jun. 1992, pp. III-966-III-971.

Robot Kinematics Learning Computations Using Polynomial Neural Networks, C.L. Philip Chen and A.D. McAulay, Department of Computer Science and Engineering, Wright State University, Dayton, OH 45435, Proceedings of the 1991 IEEE, International Cof. on Robotics and Automation, Sacramento, CA, Apr. 1991, pp. 2638-2643.

Poloynomial and Standard Higher Order Neural Network, Chir-Ho Cbang et al., 1993 International Conference on Neural Networks, Mar. 28-Apr. 1, 1993, pp. 989-994.

Speech Coding and Recognition: A Review, Andreas S. Spanias et al., IEICE Trans. Fundamentals, vol. E75-A, No. 2, Feb. 1992.

A Tutorial on Hidden Markov Models and Selected Applications in Speech Recognition, Lawrence R. Rabiner, Proceedings of the IEEE, vol. 77, No. 2, Feb. 1992.

FIG. 9

|  | C1 | C2 | C3 | C4 | C5 | C6 |
|---|---|---|---|---|---|---|
| $t_1$ | 0.1 | 2.0 | 15.0 | 17.5 | 3.4 | 9.3 |
| $t_2$ | 3.2 | 1.8 | 18.3 | 2.6 | 4.6 | 6.7 |
| $t_3$ | 0.7 | 8.1 | 20.1 | 5.9 | 6.8 | 2.0 |
| VOTING SUM | 4.0 | 11.9 | 53.4 | 26.0 | 14.8 | 18.0 |

170

|  | C1 | C2 | C3 | C4 | C5 | C6 |
|---|---|---|---|---|---|---|
| $t_1$ | 6 | 5 | 2 | 1 | 4 | 3 |
| $t_2$ | 4 | 6 | 1 | 5 | 3 | 2 |
| $t_3$ | 6 | 2 | 1 | 4 | 3 | 5 |

172

|  | C1 | C2 | C3 | C4 | C5 | C6 |
|---|---|---|---|---|---|---|
| $t_1$ | 0 | 0 | 2 | 3 | 0 | 1 |
| $t_2$ | 0 | 0 | 3 | 0 | 1 | 2 |
| $t_3$ | 0 | 2 | 3 | 0 | 1 | 0 |
| VOTING SUM | 0 | 2 | 8 | 3 | 2 | 3 |

174

|  | C1 | C2 | C3 | C4 | C5 | C6 |
|---|---|---|---|---|---|---|
| $t_1$ | 0 | 0 | 15.0 | 17.5 | 0 | 9.3 |
| $t_2$ | 0 | 0 | 18.3 | 0 | 4.6 | 6.7 |
| $t_3$ | 0 | 8.1 | 20.1 | 0 | 6.8 | 0 |
| VOTING SUM | 0 | 8.1 | 53.4 | 17.5 | 11.4 | 16.0 |

176

METHOD AND SYSTEM FOR CONTINUOUS SPEECH RECOGNITION USING VOTING TECHNIQUES

TECHNICAL FIELD

This invention relates generally to speech-recognition systems and, in particular, to a method for identifying continuous speech.

BACKGROUND OF THE INVENTION

For many years, scientists have been trying to find a means to simplify the interface between man and machine. Input devices such as the keyboard, mouse, touch screen, and pen are currently the most commonly used tools for implementing a man/machine interface. However, a simpler and more natural interface between man and machine may be human speech. A device which automatically recognizes speech would provide such an interface.

Applications for an automated speech-recognition device include a database query technique using voice commands, voice input for quality control in a manufacturing process, a voice-dial cellular phone which would allow a driver to focus on the road while dialing, and a voice-operated prosthetic device for the physically disabled.

Unfortunately, automated speech recognition is not a trivial task. One reason is that speech tends to vary considerably from one person to another. For instance, the same word uttered by several persons may sound significantly different due to differences in accent, speaking speed, gender, or age. In addition to speaker variability, co-articulation effects, speaking modes (shout/whisper), and background noise present enormous problems to speech-recognition devices.

Since the late 1960's, various methodologies have been introduced for automated speech recognition. While some methods are based on extended knowledge with corresponding heuristic strategies, others rely on speech databases and learning methodologies. The latter methods include dynamic time-warping (DTW) and hidden-Markov modeling (HMM). Both of these methods, as well as the use of time-delay neural networks (TDNN), are discussed below.

Dynamic time-warping is a technique which uses an optimization principle to minimize the errors between an unknown spoken word and a stored template of a known word. Reported data shows that the DTW technique is very robust and produces good recognition. However, the DTW technique is computationally intensive. Therefore, it is currently impractical to implement the DTW technique for real-world applications.

Instead of directly comparing an unknown spoken word to a template of a known word, the hidden-Markov modeling technique uses stochastic models for known words and compares the probability that the unknown word was generated by each model. When an unknown word is uttered, the HMM technique will check the sequence (or state) of the word, and find the model that provides the best match. The HMM technique has been successfully used in many commercial applications; however, the technique has many drawbacks. These drawbacks include an inability to differentiate acoustically similar words, a susceptibility to noise, and computational intensiveness.

Recently, neural networks have been used for problems that are highly unstructured and otherwise intractable, such as speech recognition. A time-delay neural network is a type of neural network which addresses the temporal effects of speech by adopting limited neuron connections. For limited word recognition, a TDNN shows slightly better result than the HMM method. However, a TDNN suffers from two serious drawbacks.

First, the training time for a TDNN is very lengthy, on the order of several weeks. Second, the training algorithm for a TDNN often converges to a local minimum, which is not the globally optimum solution.

In summary, the drawbacks of existing known methods of automated speech-recognition (e.g. algorithms requiring impractical amounts of computation, limited tolerance to speaker variability and background noise, excessive training time, etc.) severely limit the acceptance and proliferation of speech-recognition devices in many potential areas of utility.

There is thus a significant need for an automated speech-recognition system which provides a high level of accuracy, is immune to background noise, and is insensitive to differences in speakers.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 9 further illustrates examples of voting windows.

DETAILED DESCRIPTION OF A PREFERRED EMBODIMENT

Figure 1:
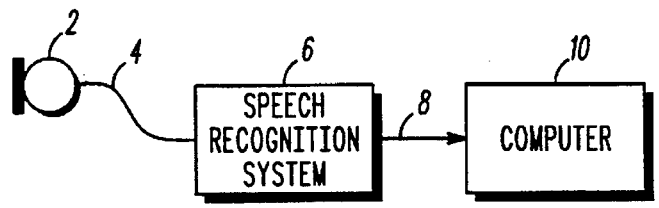
FIG. 1 illustrates a contextual diagram of a prior art speech-recognition system.

FIG. 1 shows a contextual block diagram of a prior art speech-recognition system. The diagram shows microphone 2 or other means for receiving audio input in the form of speech input and converting sound into electrical energy. Speech-recognition system 6 receives signals from microphone 2 over transmission medium 4 and performs various tasks such as waveform sampling, analog-to-digital (A/D) conversion, feature extraction and classification. Speech-recognition system 6 provides the identity of spoken sounds to computer 10 via bus 8. Computer 10 executes commands or programs which may utilize the data provided by speech-recognition system 6.

One of ordinary skill will understand that speech-recognition system 6 may transmit spoken sound identities to devices other than a computer. For example, a communication network, data storage system, or transcription device could be substituted for computer 10.

The system depicted by FIG. 1 is used for recognizing spoken sound from continuously spoken speech. Continuously spoken speech, or continuous speech, takes place when a person speaking into the microphone does not un-naturally pause between each spoken sound. Rather, the person speaking only pauses when the natural form of speech dictates a pause, such as at the end of a sentence. For this reason, continuous speech can be thought of as "natural" speech which occurs in an ordinary conversation. Continuously spoken speech includes at least one spoken sound, wherein a spoken sound may be a word, syllable, or phoneme. A phoneme is the smallest element of speech sound which indicates a difference in meaning. A syllable includes one or more phonemes, and a word includes one or more syllables.

Figure 2:
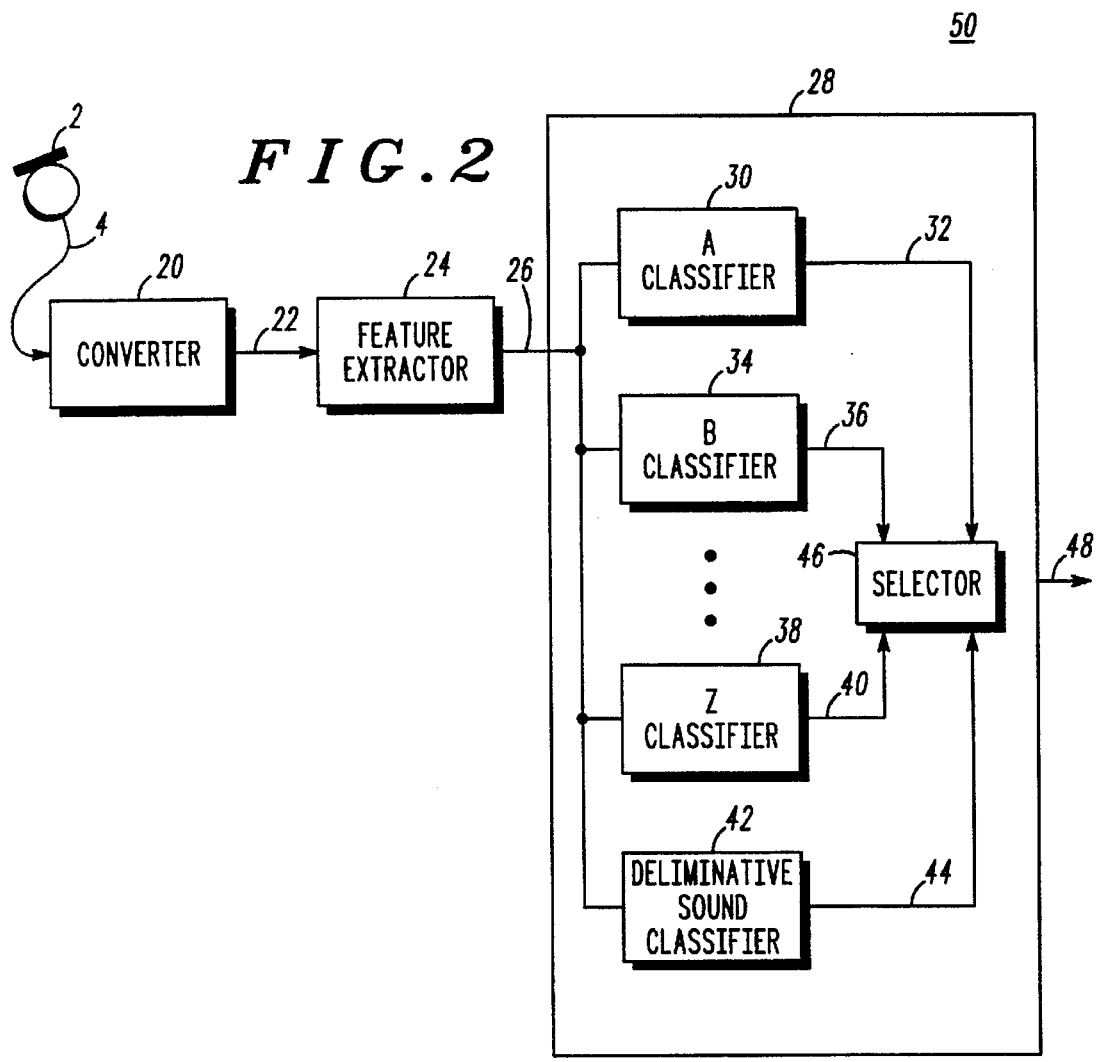
FIG. 2 illustrates a block diagram of a speech-recognition, system which incorporates an embodiment of the present invention.

FIG. 2 illustrates a block diagram of a speech-recognition system 50 which incorporates an embodiment of the present invention. The speech-recognition system comprises microphone 2, converter 20, feature extractor 24, and recognition means 28. Recognition means 28, in turn, includes a plurality of classifiers and selector 46. Of the plurality of classifiers, sound classifiers 30, 34, and 38 are shown. In addition to sound classifiers, delimitative sound classifier 42 is also shown. The details of delimitative sound classifier 42 are provided by Related Invention No. 4 identified above.

Figure 5:
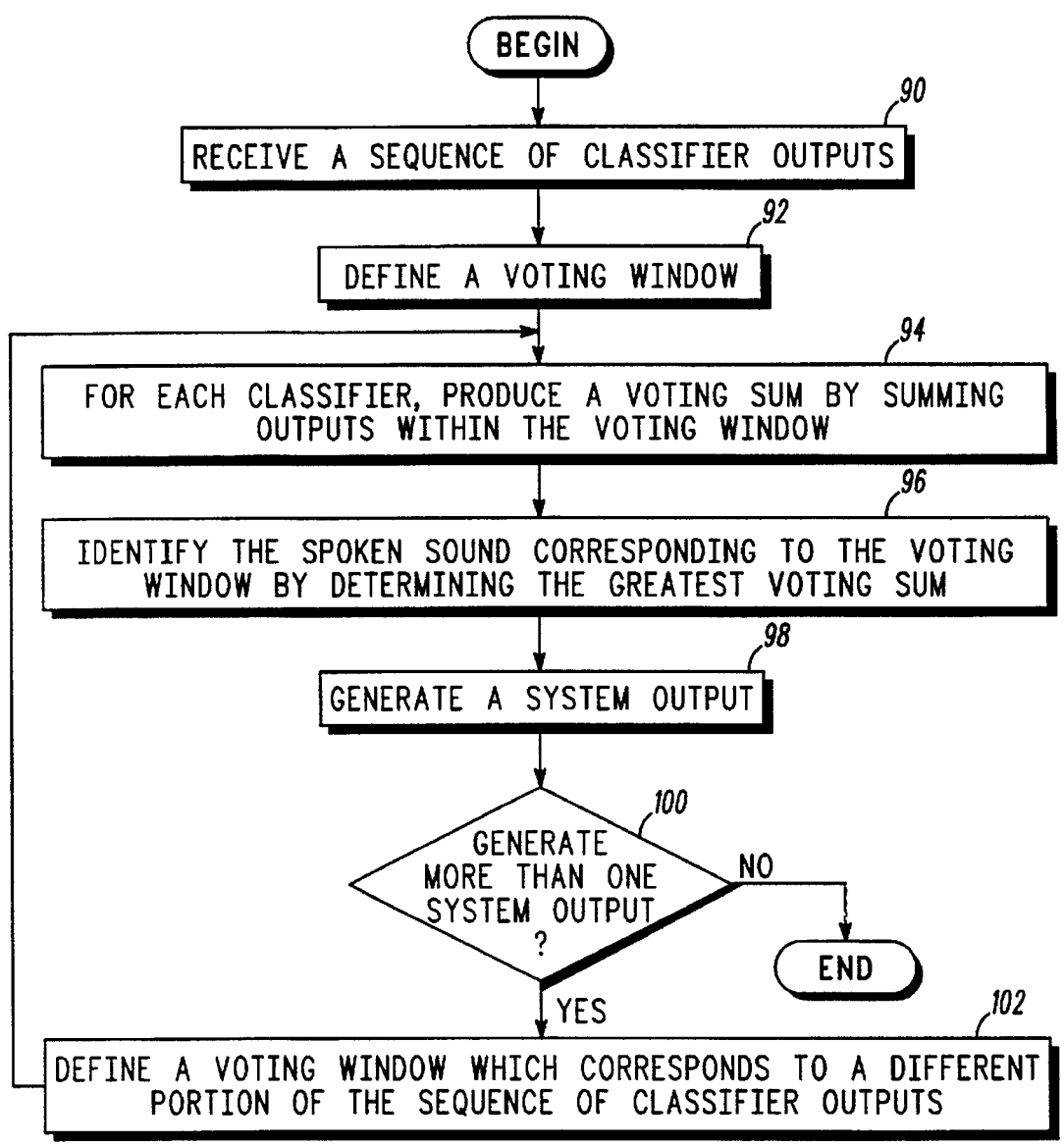
FIG. 5 shows a flow diagram of a method of identifying a spoken sound from continuously spoken speech in accordance with a preferred embodiment of the present invention.
Figure 6:
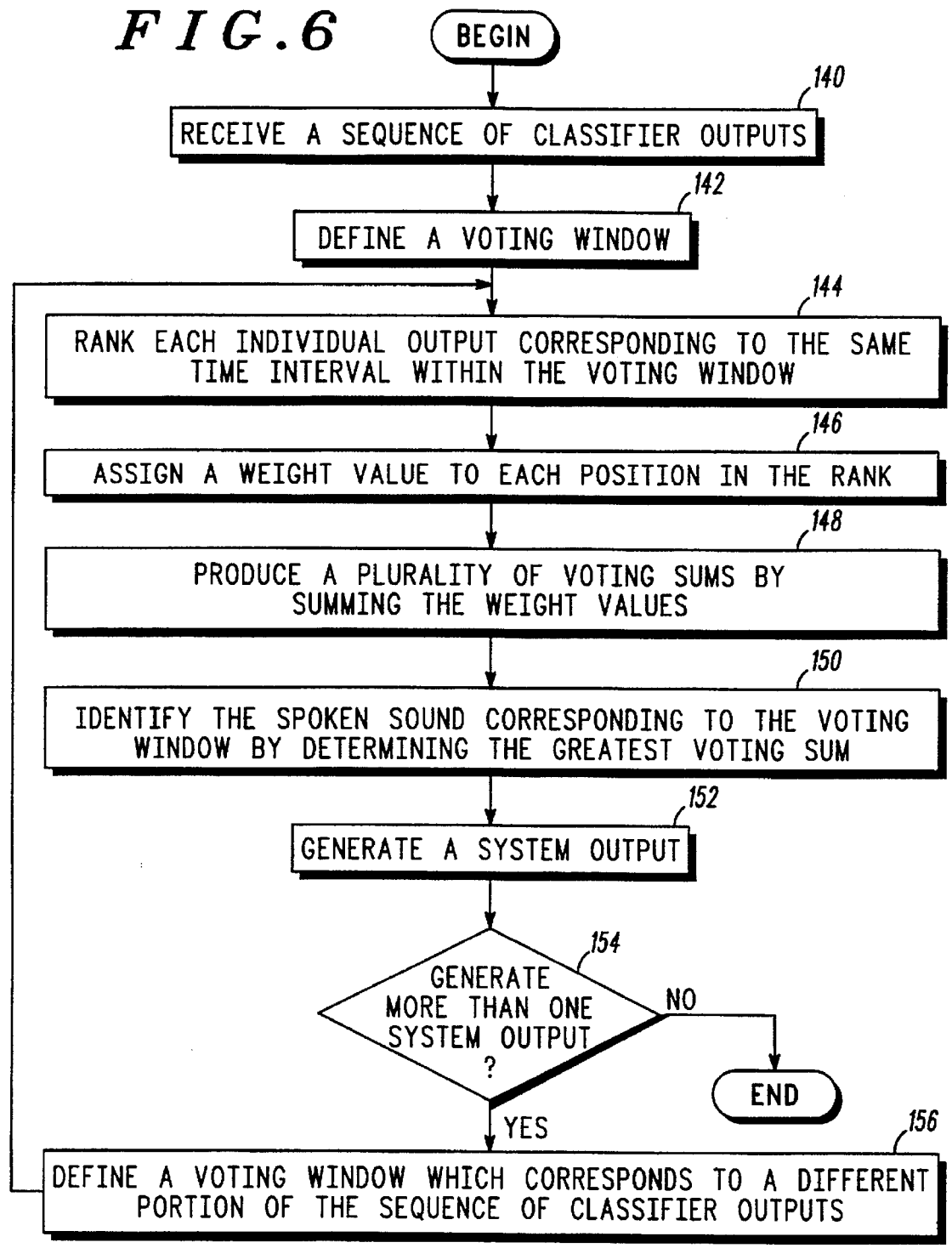
FIG. 6 shows a flow diagram of a method of identifying a spoken sound from continuously spoken speech in accordance with another embodiment of the present invention.

The embodiments of the present invention shown in FIGS. 5 and 6 resides in selector 46. The embodiment of the present invention shown in FIG. 9 resides in speech-recognition system 50.

In one embodiment of the present invention, speech-recognition system 50 is implemented by software running on a computer processor such as a microprocessor. However, one of ordinary skill will recognize that a programmable logic array, application specific integrated circuit (ASIC), or other digital logic device could also be used to implement any of the functions performed by speech-recognition system 50.

Continuous speech is received by microphone 2 and converted to signals which are transmitted across transmission medium 4 to converter 20. Upon receiving a speech sample, converter 20 performs various functions which utilize the speech sample. These functions include waveform sampling, filtering, and analog-to-digital (A/D) conversion. Converter 20 generates as output a speech signal which is passed to feature extractor 24 via bus 22. Feature extractor 24 produces a plurality of features from the speech signal. These features are passed to the plurality of classifiers over bus 26. In response to the features, each classifier generates a sequence of outputs. The classifier outputs are then passed to selector 46 over buses 32, 36, 40, and 44. In turn, selector 46 generates a system output on bus 48.

An example of the operation of the system presented by FIG. 2 is as follows. When a user utters continuous speech, microphone 2 generates a signal which represents the acoustic waveform of the speech. Typically, the signal from microphone 2 is an analog signal. This signal is then fed to converter 20 for digitization. Converter 20 includes appropriate means for A/D conversion. An A/D converter may sample the signal from microphone 2 several thousand times per second between 8000 and 14,000 times per second, depending on the frequency components of the speech signal from the microphone). Each of the samples is then converted to a digital word, wherein the length of the word is between 12 and 32 bits.

Those of ordinary skill in the art will understand that the sampling rate and word length of A/D converters may vary and that the numbers given above do not place any limitations on the sampling rate or word length of an A/D converter used in conjunction with an embodiment of the present invention.

The speech signal comprises one or more of these digital words, wherein each digital word represents a sample of the continuous speech taken at an instant in time. The speech signal is passed to feature extractor 24 where the digital words, over an interval of time, are grouped into a data frame. In accordance with a preferred embodiment of the present invention, each data frame represents 10 milliseconds of speech signal. However, one of ordinary skill in the art will recognize that other data frame durations may be used, depending on a number of factors such as the duration of the spoken sounds to be identified. The data frames are in turn subjected to cepstral analysis, a method of feature extraction, which is performed by feature extractor 24.

The cepstral analysis, a method of feature extraction, which is performed on the speech signal, results in a representation of the speech signal which characterizes the relevant features of the continuous speech over the interval of time. It can be regarded as a data reduction procedure that retains vital characteristics of the speech signal and eliminates undesirable interference from irrelevant characteristics of the speech signal, thus easing the decision-making process for the plurality of classifiers.

The cepstral analysis is performed as follows. First, a p-th order (typically p=12 to 14) linear prediction analysis is applied to a set of digital words from the speech signal to yield p prediction coefficients. The prediction coefficients are then converted into cepstrum coefficients using the following recursion formula:

$$c(n) = a(n) + \sum_{k=1}^{n-1} (1 - k/n) a(k) c(n-k) \qquad \text{Equation (2)}$$

wherein $c(n)$ represents the $n^{th}$ cepstrum coefficient, $a(n)$ represents the $n^{th}$ prediction coefficient, $1 \leq n \leq p$, p is equal to the number of cepstrum coefficients, n represents an integer index, and k represents an integer index, and $a(k)$ represents the $k^{th}$ prediction coefficient and $c(n-k)$ represents the $(n-k)^{th}$ cepstrum coefficient.

The vector of cepstrum coefficients is usually weighted by a sine window of the form, $$\alpha(n) = 1 + (L/2)\sin(\pi n/L) \qquad \text{Equation (3)}$$

wherein $1 \leq n \leq p$, and L is an integer constant, giving the weighted cepstrum vector, $C(n)$, wherein $$C(n) = c(n) \qquad \text{Equation (4)}$$

This weighting is commonly referred to as cepstrum liftering. The effect of this liftering process is to smooth the spectral peaks in the spectrum of the speech signal. It has also been found that cepstrum liftering suppresses the existing variations in the high and low cepstrum coefficients, and thus considerably improves the performance of the speech-recognition system.

The result of the cepstral analysis is a smoothed log spectra which corresponds to the frequency components of the speech signal ever an interval of time. The significant features of the speech signal are thus preserved in the spectra. Feature extractor 24 generates a respective feature frame which comprises data points from the spectrum generated from a corresponding data frame. The feature frame is then passed to the plurality of classifiers.

In accordance with an embodiment of the present invention, a feature frame contains twelve data points, wherein each of the data points represents the value of cepstrally-smoothed spectrum at a specific frequency over the interval of time. The data points are 32-bit digital words. Those skilled in the art will understand that the present invention places no limits on the number of data points per feature frame or the bit length of the data points; the number of data points contained in a feature frame may be twelve or any other appropriate value, while the data point bit length may be 32 bits, 16 bits, or any other value.

Referring now to the classifiers of recognition means 28, a parametric decision method is used by each of the classifiers to determine whether a set of features belongs to a certain class. A class may represent spoken sound. Using a parametric decision method, a classifier implements a discriminant function y(X), where X={$x_1, x_2, \ldots, x_n$} is the set of features and n is an integer index. The set of features may include cepstrum, linear predictive, or Fourier coefficients. Upon receiving a set of features, a classifier computes its respective discriminant function and produces a result. Generally, the magnitude of the result indicates whether a set of features belongs to the class which corresponds to the discriminant function. In accordance with a preferred embodiment of the present invention, the magnitude of the result is directly proportional to the likelihood that the set of features belongs to the corresponding class.

The discriminant function implemented by each of the classifiers is based upon the use of a polynomial expansion and, in a loose sense, the use of an orthogonal function, such as a sine, cosine, exponential/logarithmic, Fourier transformation, Legendre polynomial, non-linear basis function such as a Volterra function or a radial basis function, or the like, or a combination of polynomial expansion and orthogonal functions.

The general case of the polynomial expansion is represented by Equation 1 as follows:

$$y = \sum_{i=1}^{m} w_{i-1} x_1^{g_{1i}} x_2^{g_{2i}} \ldots x_n^{g_{ni}} \qquad \text{Equation (1)}$$

where $x_i$ represent the classifier inputs and can be a function such as $x_i = f_i(z_j)$, wherein $z_j$ is any arbitrary variable, and where the indices i, j, and m may be any integers; where y represents the output of the classifier; where $w_{i-1}$ represents the coefficient for the ith term; where $g_{1i}, \ldots, g_{ni}$ represent the exponents for the ith term and are integers; and n is the number of classifier inputs.

As disclosed by above-identified Related Invention No. 3, a learning machine may be trained to behave as a classifier by tuning the coefficients of a discriminant function which is based on a polynomial expansion of the form given by Equation 1. Related Invention No. 3 describes a training algorithm which determines the coefficient, $w_{i-1}$, of each term in the polynomial expansion.

In FIG. 2, each classifier implements a different discriminate function. In the example shown, classifier 30 implements a discriminate function for the spoken sound which represents sound of the character "A"; while classifier 34 implements a discriminate function for the spoken sound which represents sound of the character "B"; and classifier 38 implements a discriminate function for the spoken sound which represents the sound of the character "Z", Delimitative sound classifier 42 implements a discriminate function for a delimitative sound. The discriminate functions implemented by each of the classifiers in recognition means 28 is a polynomial expansion of the form given by Equation 1.

In the example, the result of the discriminate function implemented by classifier 30 is passed to selector 46 across bus 32; the result of the discriminate function implemented by classifier 34 is passed across bus 36 to selector 46; and the result of the discriminate function implemented by classifier 38 is passed across bus 40 to selector 46. In addition, the result of the discriminate function implemented by delimitative sound classifier 42 is passed across bus 44 to selector 46.

Selector 46 generates at least one system output, based on the classifier outputs, which represents the identity of the spoken sound. The system output includes a class label which is associated with one of the classifiers. The class label may be a binary code which represents the spoken sound in ASCII. In a preferred embodiment of the present invention, selector 46 generates system outputs by implementing the method shown in FIG. 5.

Figure 3:
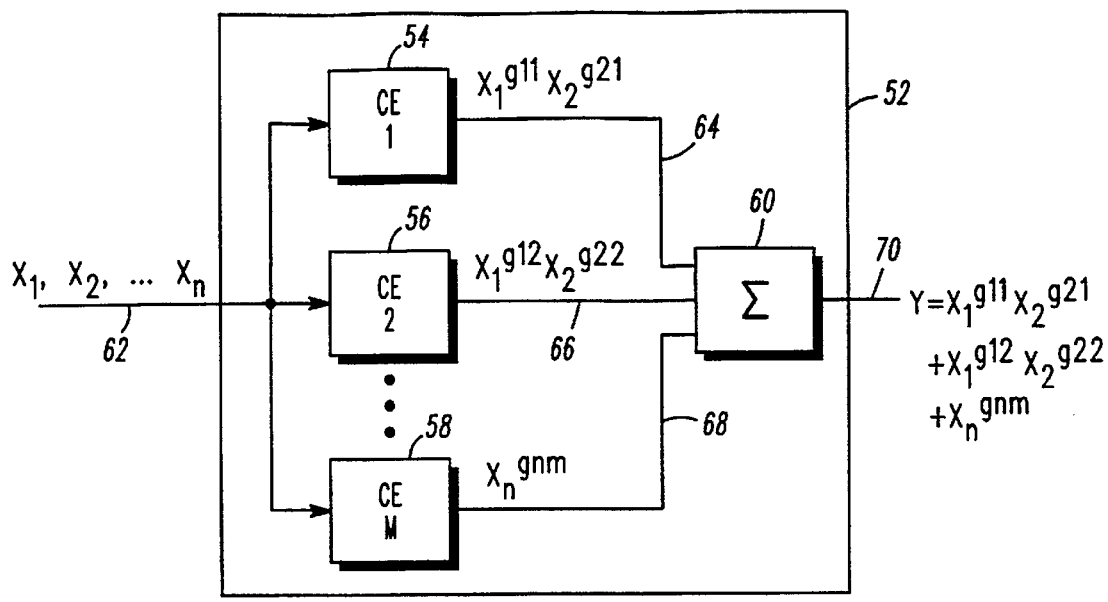
FIG. 3 is a block diagram of a classifier that can generate classifier output signals utilized by an embodiment of the present invention.

FIG. 3 is a block diagram of a classifier that can generate classifier output signals utilized by an embodiment of the present invention. Classifier 52 is a possible implementation of one of the plurality of classifiers depicted in FIG. 2. Classifier 52 includes a plurality of computing elements, of which computing element 54, 56, and 58 are shown. Classifier 52 also includes summation circuit 60.

A polynomial expansion is calculated by classifier 52 in the following manner. A plurality of data inputs $x_1, x_2, \ldots, x_n$ are fed into classifier 52 using bus 62 and then distributed to the plurality of computing elements, represented by 54, 56, and 58. Typically, the data inputs would be data points from a feature frame. After computing a term, a computing element passes the term to summing circuit 60 which sums the terms computed by the computing elements and places the sum on output 70.

For example, FIG. 3 depicts the computation of the polynomial $y = x_1 g_{11} x_2 g_{21} + x_1 g_{12} x_2 g_{22} + \ldots x_n g_{nm}$. Computing element 54 computes the term $x_1 g_{11} x_2 g_{21}$ and then sends it to summing circuit 60 over bus 64; computing element 56 computes the term $x_1 g_{12} x_2 g_{22}$ and then sends it to summing circuit 60 over bus 66; and computing element 58 computes the term $x_n g_{nm}$ and then sends it to summing circuit 60 over bus 68. Upon receiving the terms from the computing elements, summing circuit 60 sums the terms and places the result of the polynomial expansion, y, on output 70.

It will be apparent to one of ordinary skill that classifier 52 is capable of computing polynomials of the form given by Equation 1 which have a number of terms different from the above example, and polynomials whose terms are composed of data inputs different from those of the above example.

In one embodiment of the present invention, classifier 52 is implemented by software running on a processor such as a microprocessor. However, one of ordinary skill in the art will recognize that a programmable logic array, ASIC or other digital logic device could also be used to implement the functions performed by the classifier 52.

Figure 4:
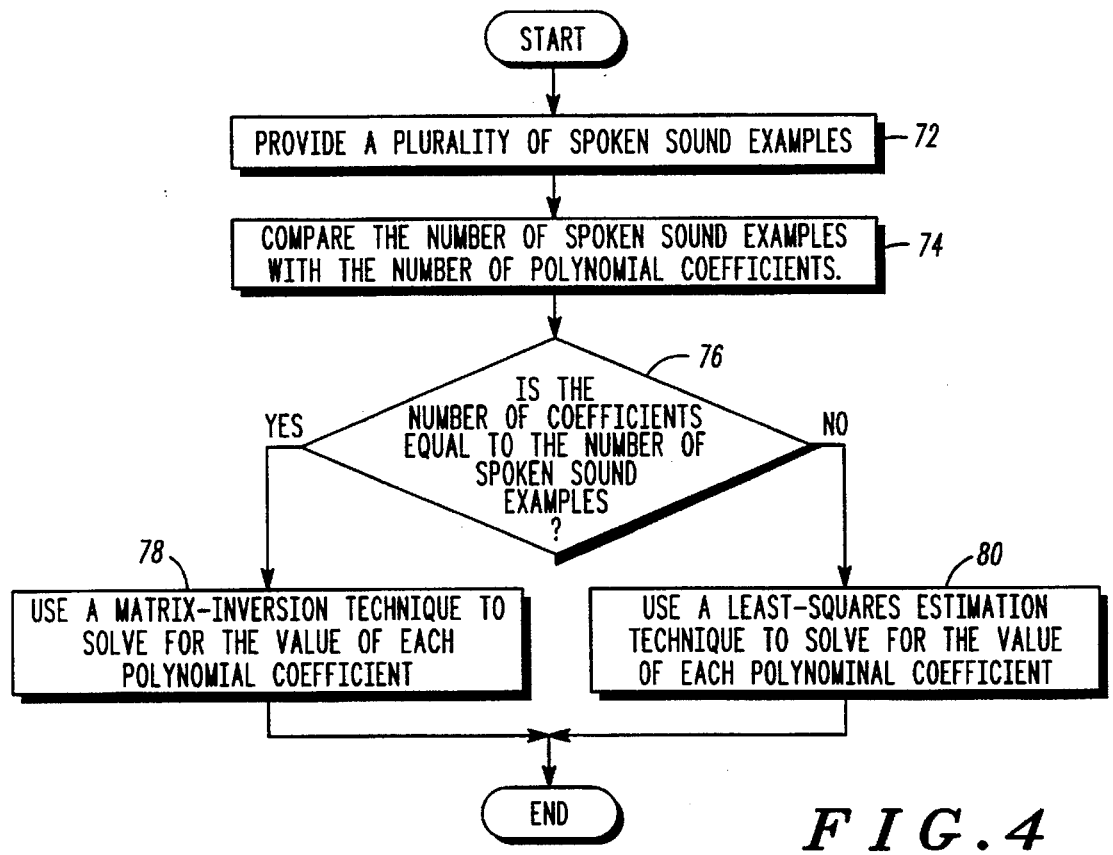
FIG. 4 shows a flow diagram of a method of training the classifier of FIG. 3.

FIG. 4 shows a flow diagram of a method of training the classifier of FIG. 3. A speech-recognition system constructed in accordance with an embodiment of present invention has principally two modes of operation: (1) a training mode in which examples of spoken sounds are used to train the plurality of classifiers, and (2) a recognition mode in which spoken sounds in continuous speech are identified. Referring to FIG. 2, generally, a user must train the plurality of classifiers by providing examples of all of the spoken sounds that the system is to recognize.

In an embodiment of the present invention, a classifier may be trained by tuning the coefficients of a discriminant function which is based on a polynomial expansion of the form given by Equation 1. For the discriminant function to effectively classify input data, the coefficient, $w_{i-1}$, of each term in the polynomial expansion must be determined. This can be accomplished by the use of the following training method.

In box 72, a plurality of spoken sound examples is provided. A spoken sound example comprises two components. The first component is a set of classifier inputs derived from the spoken sound, and the second component is a corresponding desired classifier output signal.

Next, in box 74, the trainer compares the number of spoken sound examples with the number of polynomial coefficients in the discriminate function.

In decision box 76, a check is made to determine whether the number of polynomial terms is equal to the number of spoken sound examples. If so, the spoke sound examples can be represented as a square-matrix and the method proceeds to box 78. If not, the method proceeds to box 80.

In box 78, a matrix inversion technique is used to solve for the value of each polynomial coefficient. Using matrix inversion, the discriminant transfer function can be represented by the matrix equation Y=WZ, where Y represents a matrix of example classifier output signals, W represent a matrix of coefficients, and Z is a matrix of signals representing functions of the example classifier inputs, such as exponential functions. The coefficient matrix is determined according to the equation $W=Z^{-1}Y$, where $Z^{-1}$ represents the inverse matrix of Z.

In box 80, a least squares estimation technique is used to solve for the value of each polynomial coefficient. Essentially, a polynomial discriminant function is fitted to the set of spoken sound examples using a suitable least-squares estimation technique such as: least-squares, extended least-squares, pseudo-inverse, Kalman filter, maximum-likelihood algorithm, Bayesian estimation, and the like.

In implementing a classifier which is usable in an embodiment of the present invention, one generally selects the number of computing elements in the classifier to be equal to or less than the number of examples presented to the classifier.

FIG. 5 shows a flow diagram of a method of identifying a spoken sound from continuously spoken speech in accordance with a preferred embodiment of the present invention. In box 90, outputs from a plurality of classifiers are received. Each classifier generates a sequence of outputs which results from computing a discriminant function based on a polynomial expansion of the form given by Equation 1. The operations of the classifiers are synchronized such that outputs are received corresponding to specific intervals of time.

In box 92, a voting window is defined. A voting window encompasses a plurality of outputs from each of the classifiers; furthermore, a voting window corresponds to a predetermined windowing interval (comprising a plurality of the time intervals used for feature extraction) and includes only those outputs generated during the predetermined windowing interval. Next, in box 94, a voting sum is generated for each of the plurality of classifiers. A voting sum is generated for each classifier by summing the classifier outputs which occur within the predetermined windowing interval, while simple summing is used to generate the voting sum in a preferred embodiment of the present invention. One of ordinary skill in the art will recognize that any weighted sum of the classifier outputs could likewise be used. Thereby, triangular, raised cosine, Hamming, Hanning, exponential and other windowing functions could likewise be implemented.

In box 96, the spoken sound is identified by determining a winning classifier within the voting window. The winning classifier corresponds to the greatest voting sum of the voting window. Essentially, a winning classifier identifies the spoken sound since each classifier has an associated class label which represents a spoken sound.

In box 98, a system output is generated which includes the class label of the winning classifier.

In decision box 100, a check is made to determine whether another system output should be generated. If so, the method proceeds to box 102. If not, the method terminates.

In box 102, another voting window is defined which includes a different subset of classifier outputs and corresponds to a different predetermined interval of time. Upon exiting box 102, the method returns to box 94.

FIG. 6 shows a flow diagram of a method of identifying a spoken sound from continuously spoken speech in accordance with another embodiment of the present invention. In box 140, outputs from a plurality of classifiers are received. Each classifier generates a sequence of outputs which results from computing a discriminant function. The discriminant function could be based on a polynomial expansion of the form given by Equation 1. The operations of the classifiers are synchronized such that outputs are received corresponding to specific intervals of time.

In box 142, a voting window is defined. A voting window encompasses a plurality of outputs from each of the classifiers; furthermore, a voting window corresponds to a predetermined windowing interval and includes only those outputs generated during the predetermined windowing interval.

Next, in box 144, outputs corresponding to the same specific interval within the voting window are ranked according to magnitude, creating a rank order for each specific interval. Position in the rank order indicates the relative magnitude of the output; thus, the output with the greatest magnitude occupies the first position and the output with the smallest magnitude occupies the last position. Generally, more than one rank order will be created for the voting window since the duration of a voting window includes more than one specific interval.

In box 146, a weight value is assigned to each of the positions in the rank orders. In one embodiment of the present invention; the first position is assigned a weight value of three; the second position is assigned a weight value of two; the third position is assigned a weight value of one; and all other positions in the rank orders are assigned a weight value of zero. In another embodiment of the present invention, the first three positions in a rank order are assigned the magnitude of the corresponding classifier output, while the remaining positions are assigned a value of zero.

In box 148, a voting sum for each classifier is generated by summing, over the duration of the voting window, the weight values corresponding to the classifier.

In box 150, the spoken sound is identified by determining a winning classifier within the voting window. The winning classifier corresponds to the greatest voting sum of the voting window. Essentially, a winning classifier identifies the spoken sound since each classifier has an associated class label which represents a spoken sound.

In box 152, a system output is generated which includes the class label of the winning classifier.

In decision box 154, a check is made to determine whether another system output should be generated. If so, the method proceeds to box 156. If not, the method terminates.

In box 156, another voting window is defined which includes a different subset of classifier outputs and corresponds to a different predetermined windowing interval. Upon exiting box 156, the method returns to box 144.

Figure 7:
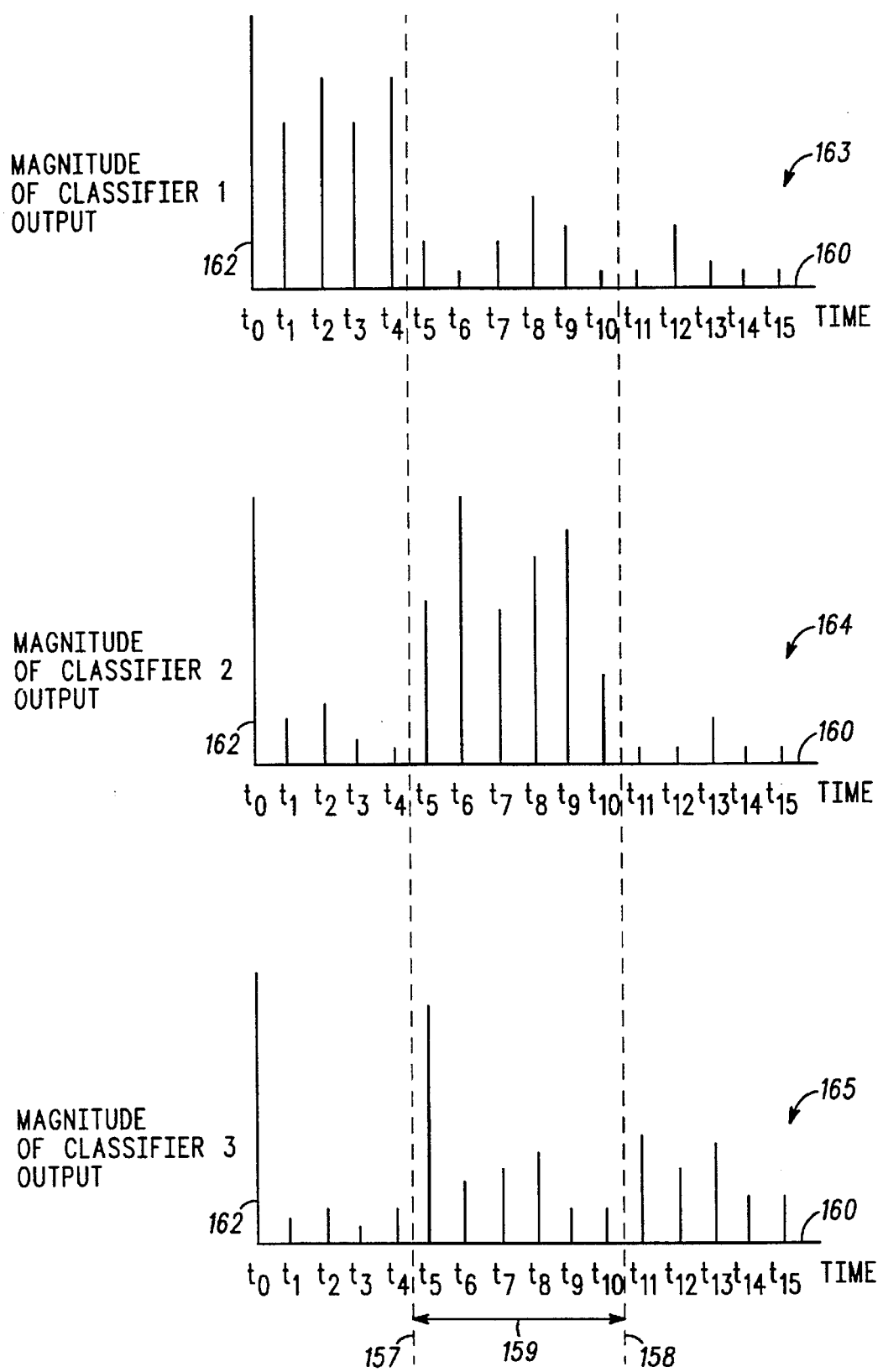
FIG. 7 illustrates an example of a voting window superimposed on graphs of classifier outputs.

FIG. 7 illustrates the concept of a voting window. Graph 163 depicts the outputs of a first classifier; graph 164 depicts the outputs of a second classifier; and graph 165 depicts the outputs of a third classifier. Axis 160 indicates time and axis 162 indicates the magnitude of the classifier outputs. The voting window is defined by a starting time, which is depicted by dotted line 157; an ending time, which is depicted by dotted line 158; and a predetermined windowing interval, or duration, which is depicted by arrow 159. In the example shown, the voting window includes outputs of the first, second, and third classifiers which occur at specific time intervals $t_5$–$t_{10}$.

Although FIG. 7 shows a voting window which includes a sequence of three outputs from six different classifiers, it will be apparent to one of ordinary skill in the art that a voting window may include a sequence having more or less than three outputs from any number of classifiers.

Figure 8:
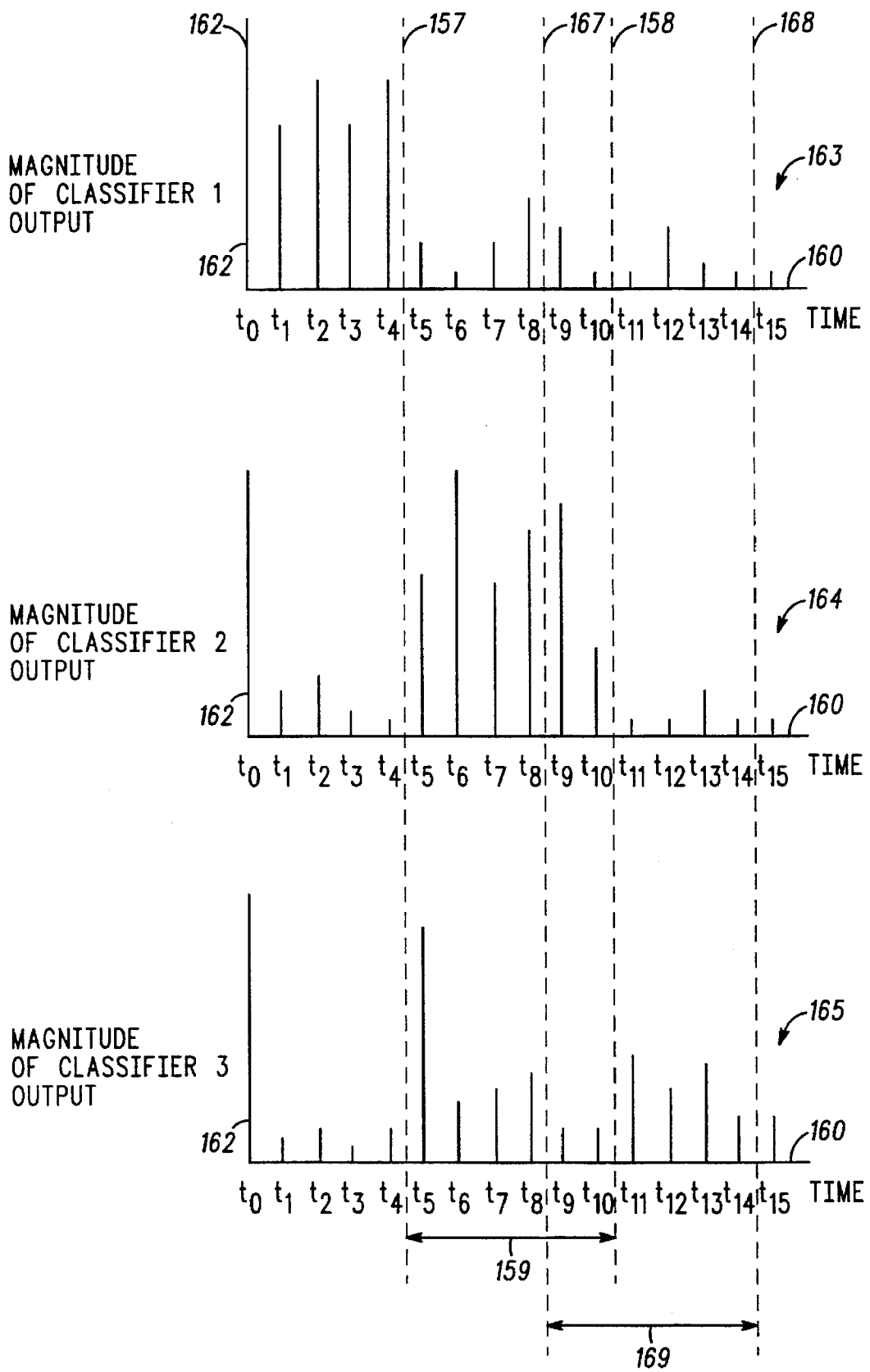
FIG. 8 illustrates an example of two voting windows superimposed on graphs of classifier outputs.

FIG. 8 conceptually illustrates an example of two voting windows. A first voting window is defined by a first starting time, which is depicted by dotted line 157; a first ending time, which is depicted by dotted line 158; and a first predetermined windowing interval, which is depicted by arrow 159. In the example shown, the first voting window includes outputs of the first, second, and third classifiers which occur at specific time intervals $t_5$–$t_{10}$ and is used to determine a first system output. A second voting window is defined by a second starting time, which is depicted by dotted line 167; a second ending time, which is depicted by dotted line 168; and a second predetermined windowing interval, which is depicted by arrow 169. In the example shown, the second voting window includes outputs of the first, second, and third classifiers which occur at specific time intervals $t_9$–$t_{14}$ and is used to generate a second system output corresponding to a later portion of the continuous speech than the first system output.

Although FIG. 8 shows an example of voting windows which overlap in time, it will be apparent to one of ordinary skill in the art that voting windows need not overlap, and in fact, they may be separated by an intervening period of time. Furthermore, one of ordinary skill will realize that the predetermined interval of time may vary between different voting windows.

FIG. 9 further illustrates examples of voting windows. Voting window 170 includes fifteen values which represent the magnitudes of classifier outputs. The columns of values correspond to classifiers. For example, the values in the left-most column are outputs generated by classifier C1, the values in the next column are outputs generated by classifier C2, and so forth. The rows of values correspond to intervals of time within voting window 170.

Although voting window 170 shows magnitudes which are real numbers ranging between 0 and 20, one of ordinary skill in the art will appreciate that a magnitude may be any number type within any range.

Voting window 172 shows an example of ranking the outputs of voting window 170. At each interval of time, the outputs are ordered according to magnitude. Each output occupies a position in the rank. For instance, voting window 172 shows that at time $t_1$, the output of classifier C4 occupies the first position, the output of classifier C3 occupies the second position, and so forth.

Voting window 174 shows an example of assigning weight values to the positions in the rank order. At each interval, the first position is assigned a weight value of three, the second position is assigned a weight value of two, the third position is assigned a weight value of one, and all other positions are assigned a weight value of zero.

Voting window 176 shows another example of assigning weight values to the positions in the rank order. At each interval, the first three positions in a rank order are assigned the magnitudes of their corresponding classifier outputs, while the remaining positions are assigned a value of zero.

The winning classifier of voting windows 170, 172, 174, and 176 is C3, since it generates the greatest voting sum within the duration of each voting window.

The reason for representing a classifier output as non-parametric values, i.e., zero, one, two, three, for example, as depicted by voting window 174, is to prevent a "shouting classifier" from skewing the determination of a winning classifier. A shouting classifier is a classifier which, for one reason or another, generates a disproportionately large output relative to the other classifiers. Thus, if the magnitudes of the classifier outputs are not converted to non-parametric values, one and zero as an example, a classifier which shouts at only one time interval within the voting window could be erroneously identified as the winning classifier. This could negatively affect the overall performance of the speech-recognition system.

Figure 10:
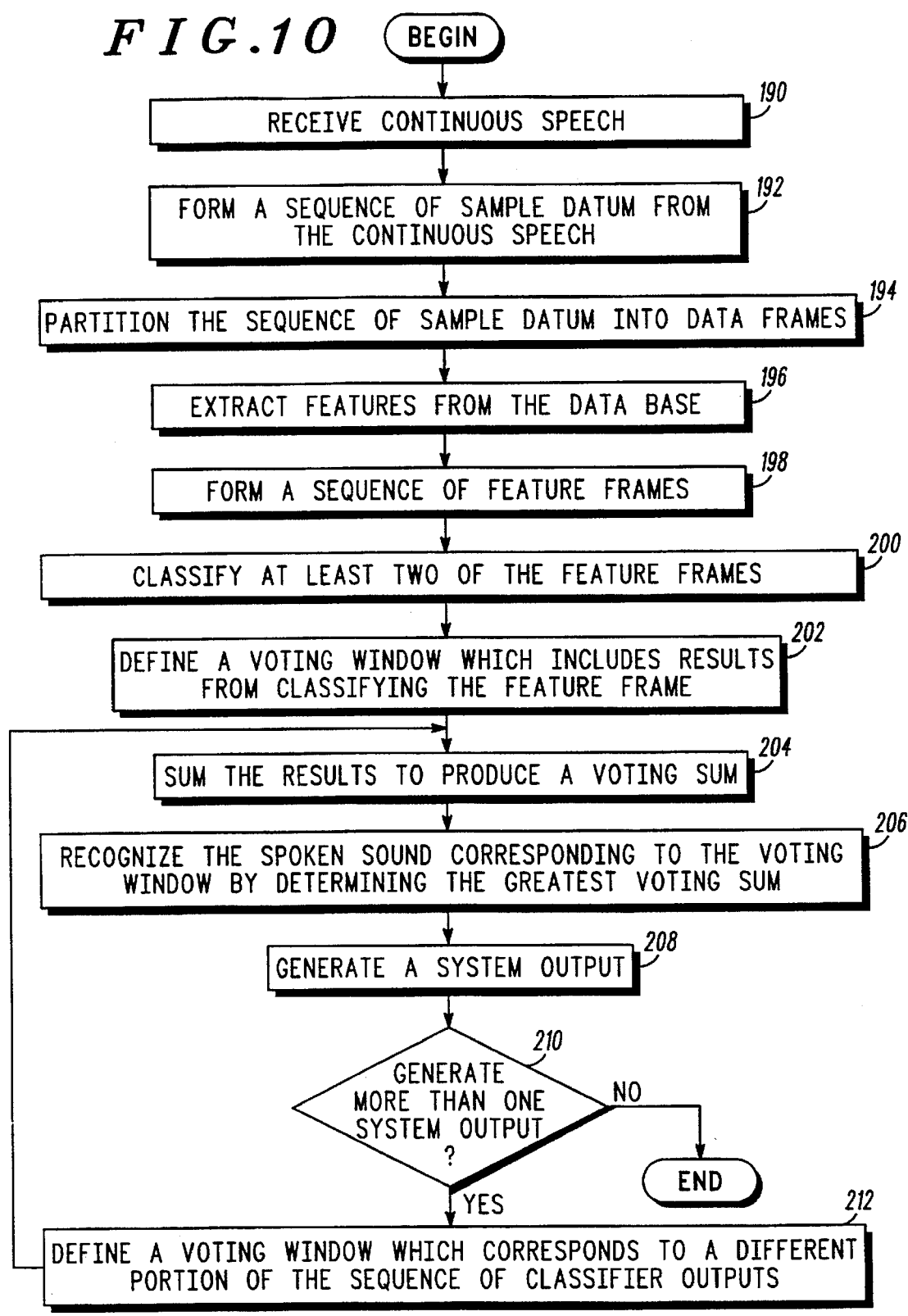
FIG. 10 shows a flow diagram of a method of identifying a spoken sound from continuously spoken speech in accordance with a further embodiment of the present invention.

FIG. 10 shows a flow diagram of a method of identifying a spoken sound from continuously spoken speech in accordance with another embodiment of the present invention. In box 190, continuous speech is received by a speech-recognition system. In box 192, a sequence of samples is taken from the continuous speech. Generally, each sample corresponds to a different interval of time during the continuous speech. In box 194, a plurality of data frames are formed from the samples. Each data frame includes at least one sample; however, the data frame typically includes a sequence of samples.

Next, in box 196, a plurality of features are extracted from the data frames. Each feature corresponds to one of the data frames, and more than one feature may be extracted from a given data frame. Examples of features which may be extracted are cepstrum, predictive, and Fourier coefficients.

In box 198, a sequence of feature frames is formed. Each feature frame corresponds to an interval of the continuous speech and includes at least one of the extracted features.

In box 200, at least two of the feature frames are classified by computing one or more discriminant functions which yield results. Each result indicates the likelihood of a particular feature frame belonging to the class corresponding to the discriminant function. In response to a sequence of feature frames, a discriminant function generates a sequence of outputs wherein each output corresponds to specific interval of the continuous speech.

In box 202, a voting window is defined. A voting window includes a subset of outputs from each of the discriminant functions; furthermore, a voting window corresponds to a predetermined windowing interval and includes only those outputs generated during the predetermined windowing interval. Next, in box 204, a voting sum is generated corresponding to each of the discriminant functions. A voting sum is generated by summing the classifier outputs which occur within the predetermined windowing interval.

In box 206, the spoken sound is identified by determining a winning class label within the voting window. The winning class label corresponds to the discriminant function which produces the greatest voting sum during the predetermined windowing interval.

In box 208, a system output is generated which includes the winning class label.

In decision box 210, a check is made to determine whether another system output should be generated. If so, the method proceeds to box 212. If not, the method terminates.

In box 212, another voting window is defined which includes a different subset of discriminant function outputs and corresponds to a different predetermined windowing interval. Upon exiting box 212, the method returns to box 204.

Figure 11:
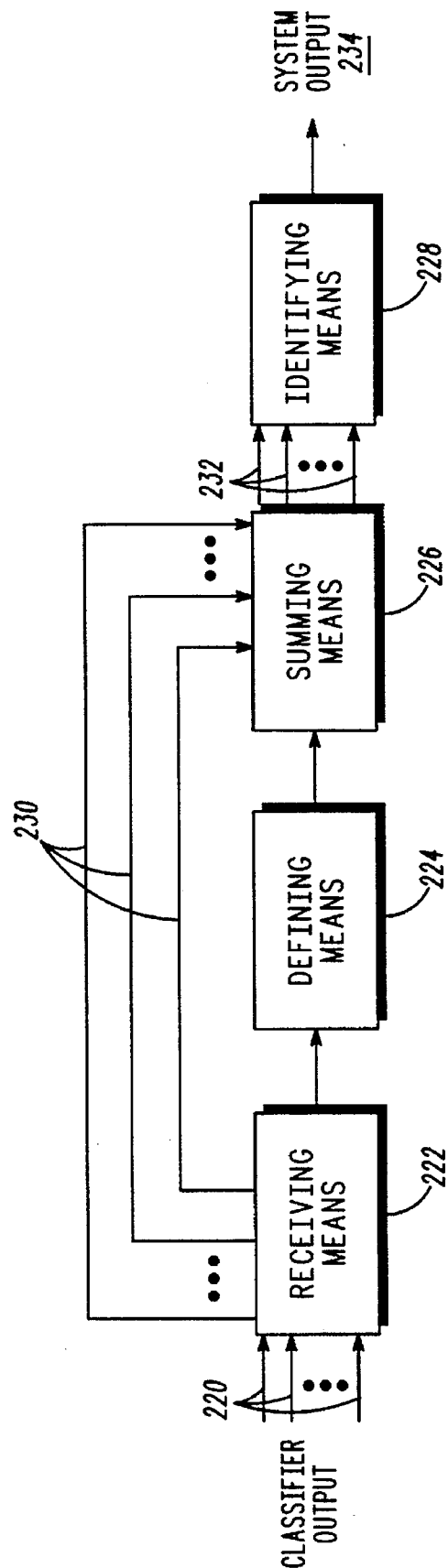
FIG. 11 shows a block diagram of a system in accordance with one embodiment of the present invention.

FIG. 11 shows a block diagram of a system in accordance with one embodiment of the present invention. This embodiment is used in a speech recognition of the type generally described with reference to FIG. 2 and implements the methods described in conjunction with FIG. 5. A plurality of classifiers each generate, over time, a sequence of individual outputs 220 in the form of output signals which are received by receiving means 222. Defining means 224 defines a voting window which has a duration and includes a subsequence of outputs from each of the plurality of classifiers, wherein each of the subsequence of outputs corresponds to an interval of time.

Summing means 226 produces a plurality of voting sums 232, each voting sum being a signal corresponding to one of the plurality of classifiers, based on a sum of each of the subsequence of received outputs 230 corresponding to a same classifier. Identifying means 228, in turn, identifies the spoken sound corresponding to the particular voting window by determining from the plurality of classifiers, the classifier with the greatest voting sum. A signal 234, indicative of the winning classifier, is output by the identifying means 228.

Thus there has been described herein a concept, as well as several embodiments including a preferred embodiment, of a method and system for identifying spoken sounds in continuous speech.

Because the various embodiments of methods and systems for identifying spoken sounds in continuous speech as herein-described compare outputs from a plurality of classifiers, they provide a significant improvement in recognition accuracy.

Additionally, the various embodiments of the present invention as herein-described use comparison methods which allow spoken sounds in continuous speech to be identified in a manner that reduces the overall complexity and cost of a speech-recognition system.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a speech-recognition system having a plurality of classifiers, a method of identifying a spoken sound, comprising the following steps:
   (a) receiving a plurality of classifier output signals from the classifiers corresponding to an interval, each of the classifier output signals having been generated according to a polynomial discriminant function;
   (b) ranking by magnitude the classifier output signals to produce a rank-order of classifier output signals corresponding to the interval;
   (c) weighting each position in the rank-order to transform the classifier output signals into a plurality of weighted values;
   (d) repeating steps (a)–(c) for a plurality of intervals, whereby generating a plurality of weighted value sequences, each of the weighted value sequences corresponding to a respective one of the plurality of classifiers;
   (e) summing each of the weighted value sequences to generate a voting sum for each classifier; and
   (f) identifying the spoken sound by selecting the voting sum having a largest magnitude.

2. The method of claim 1 further comprising the step of: generating a system output which includes a class label representing the spoken sound.

3. The method of claim 1 wherein the polynomial discriminant function has a form $$y = \sum_{i=0}^{m} w_i;$$

wherein $x_j$ represents a plurality of features; wherein i, j, m and n are integers, y represents a classifier output signal; wherein $w_i$ represents a coefficient; wherein $g_{ji}$ represents an exponent.

4. The method of claim 3, wherein the polynomial discriminant function has the form $$y = a_0 + \sum_{i=0}^{n} b_i x_i + \sum_{i=0}^{n} \sum_{j=0}^{n} c_{ij} x_i x_j;$$

wherein $a_0$ represents a zero-order coefficient, $b_i$ represents a first-order coefficient, and $c_{ij}$ represents a second-order coefficient.

5. The method of claim 1 wherein the speech-recognition system identifies a plurality of spoken sounds from continuous speech.

6. The method of claim 1 wherein steps (a)–(c) are repeated for three successive intervals.

7. The method of claim 1 wherein the spoken sound is selected from the group consisting of word, syllable, and phoneme.

8. A method for recognizing a spoken sound from continuous speech, comprising the following steps:
   (a) receiving the continuous speech;
   (b) sampling the continuous speech, over time, to form a sequence of sample datum which represents the continuous speech;
   (c) partitioning the sequence of sample datum into a sequence of data frames, each of the sequence of data frames includes at least two of the sequence of sample datum;
   (d) extracting a plurality of features from the sequence of data frames;
   (f) forming a sequence of feature frames from the plurality of features;
   (g) distributing one of the sequence of feature frames to a plurality of classifiers, each of the classifiers generating a classifier output signal in response thereto according to a polynomial discriminant function, whereby producing a plurality of classifier output signals;
   (h) ranking by magnitude the classifier output signals to produce a rank-order of classifier output signals corresponding to the distributed feature frame;

(i) weighting each position in the rank-order to transform the classifier output signals into a plurality of weighted values;

(j) repeating steps (g)–(i) for each feature frame included in the sequence of feature frames, whereby generating a plurality of weighted value sequences, each of the weighted value sequences corresponding to a respective one of the classifiers;

(k) summing each of the weighted value sequences to generate a voting sum for each classifier; and (l) identifying the spoken sound by selecting the voting sum having a largest magnitude.

9. The method of claim 8, further comprising the step of: generating a system output which includes a class label representing the spoken sound.

10. The method of claim 8 wherein the polynomial discriminant function has a form $$y = \sum_{i=0}^{m} w_i;$$

wherein $x_j$ represents the features included in the distributed feature frame; wherein i, j, m and n are integers, wherein y represents the classifier output signal; wherein $w_i$ represents a coefficient; wherein $g_{ji}$ represents an exponent.

11. The method of claim 10, wherein the polynomial discriminant function has the form $$y = a_0 + \sum_{i=0}^{n} b_i x_i + \sum_{i=0}^{n} \sum_{j=0}^{n} c_{ij} x_i x_j;$$

wherein $a_0$ represents a zero-order coefficient, $b_i$ represents a first-order coefficient, and $c_{ij}$ represents a second-order coefficient.

12. The method of claim 8 wherein the speech-recognition system recognizes a plurality of spoken sounds from the continuous speech.

13. The method of claim 8 wherein the sequence of feature frames consists of three feature frames.

14. The method of claim 8 wherein the spoken sound is selected from the group consisting of word, syllable, and phoneme.

15. A speech-recognition system for identifying a spoken sound and having a plurality of classifiers, comprising:

receiving means for receiving a plurality of classifier output signals from the classifiers corresponding to an interval, each of the classifier output signals having been generated according to a polynomial discriminant function;

ranking means, associatively coupled to the receiving means, for ranking by magnitude the classifier output signals to produce a rank-order of classifier output signals corresponding to the interval;

weighting means, associatively coupled to the ranking means, for weighting each position in the rank-order to transform the classifier output signals into a plurality of weighted values;

summing means, associatively coupled to the weighting means, for respectively summing a plurality of weighted value sequences to generate a plurality of voting sums, each of the voting sums corresponding to a respective one of the plurality of classifiers; and identifying means, associatively coupled to the summing means, for identifying the spoken sound by selecting from the plurality of voting sums a voting sum having a largest magnitude the subsequence to produce a voting sum for each of the plurality of classifiers, wherein the receiving means, the defining means, and the weighting means cooperatively function over a plurality of intervals to generate the plurality of weighted value sequences.

16. The speech-recognition system of claim 15 wherein the identifying means generates a system output which includes a class label representing the spoken sound.

17. The speech-recognition system of claim 15, wherein the polynomial discriminant function has a form $$y = \sum_{i=0}^{m} w_i;$$

wherein $x_j$ represents a plurality of features; wherein i, j, m and n are integers, y represents a classifier output signal; wherein $w_i$ represents a coefficient; wherein $g_{ji}$ represents an exponent.

18. The method of claim 17, wherein the polynomial discriminant function has the form $$y = a_0 + \sum_{i=0}^{n} b_i x_i + \sum_{i=0}^{n} \sum_{j=0}^{n} c_{ij} x_i x_j;$$

wherein $a_0$ represents a zero-order coefficient, $b_i$ represents a first-order coefficient, and $c_{ij}$ represents a second-order coefficient.

19. The speech-recognition system of claim 15 wherein the speech-recognition system identifies a plurality of spoken sounds from continuous speech.

20. The speech-recognition system of claim 15 wherein the subsequence includes a sequence of three outputs from one of the plurality of classifiers.

21. The speech-recognition system of claim 15 wherein the spoken sound is selected from the group consisting of word, syllable, and phoneme.

\* \* \* \* \*